US008661359B2

(12) United States Patent
Karmon et al.

(10) Patent No.: US 8,661,359 B2
(45) Date of Patent: Feb. 25, 2014

(54) RELEVANCE ORIENTED GRAPHICAL REPRESENTATION OF DISCUSSION MESSAGES

(75) Inventors: Kfir Karmon, Tel Aviv (IL); Roy Varshavsky, Tel Aviv (IL); Daniel Sitton, Tel Aviv (IL); Limor Lahiani, Tel Aviv (IL)

(73) Assignee: Microsoft Corporation, Redmond, WA (US)

( * ) Notice: Subject to any disclaimer, the term of this patent is extended or adjusted under 35 U.S.C. 154(b) by 798 days.

(21) Appl. No.: 12/685,732

(22) Filed: Jan. 12, 2010

(65) Prior Publication Data

US 2011/0173553 A1 Jul. 14, 2011

(51) Int. Cl.
*G06F 3/00* (2006.01)

(52) U.S. Cl.
USPC ........... 715/767; 715/733; 715/739; 715/751; 715/752; 715/758

(58) Field of Classification Search
None
See application file for complete search history.

(56) References Cited

U.S. PATENT DOCUMENTS

| | | | | |
|---|---|---|---|---|
| 7,124,164 B1* | 10/2006 | Chemtob | ...................... | 709/204 |
| 7,124,372 B2* | 10/2006 | Brin | .................. | 715/751 |
| 7,188,153 B2* | 3/2007 | Lunt et al. | ..................... | 709/218 |
| 7,213,206 B2* | 5/2007 | Fogg | ............... | 715/706 |
| 7,487,216 B2 | 2/2009 | Miller et al. | | |
| 7,565,613 B2 | 7/2009 | Forney | | |
| 7,685,530 B2* | 3/2010 | Sherrard et al. | ............. | 715/764 |
| 7,703,030 B2* | 4/2010 | Smirin et al. | ................. | 715/765 |
| 7,747,957 B2* | 6/2010 | Masuda | ........................ | 715/753 |
| 7,840,903 B1* | 11/2010 | Amidon et al. | ............... | 715/757 |
| 8,122,096 B2* | 2/2012 | Kussmaul et al. | ............ | 709/206 |
| 8,296,356 B2* | 10/2012 | Obasanjo et al. | ............ | 709/203 |
| 8,302,015 B2* | 10/2012 | Krishnan et al. | .............. | 715/747 |
| 8,321,358 B2* | 11/2012 | Yeh et al. | ........................ | 706/12 |
| 8,332,782 B1* | 12/2012 | Chang et al. | ................... | 715/853 |
| 8,364,753 B2* | 1/2013 | Hill | ................. | 709/203 |
| 8,370,770 B2* | 2/2013 | Vance et al. | .................. | 715/834 |
| 2003/0001890 A1* | 1/2003 | Brin | .............................. | 345/753 |
| 2003/0225879 A1 | 12/2003 | Chipchase | | |
| 2004/0017376 A1* | 1/2004 | Tagliabue et al. | ............ | 345/581 |
| 2005/0055639 A1* | 3/2005 | Fogg | ............................. | 715/535 |
| 2005/0097440 A1* | 5/2005 | Lusk et al. | ................. | 715/500.1 |
| 2005/0138564 A1* | 6/2005 | Fogg | ............................. | 715/745 |
| 2005/0160148 A1* | 7/2005 | Yu | ................................. | 709/206 |
| 2006/0010217 A1 | 1/2006 | Sood | | |
| 2006/0184557 A1* | 8/2006 | Pollack et al. | ................ | 707/101 |
| 2006/0190548 A1* | 8/2006 | Li et al. | .......................... | 709/207 |

(Continued)

OTHER PUBLICATIONS

Peter Morville, Social Network Analysis, Feb. 21, 2002, 4 pages.*

(Continued)

*Primary Examiner* — Matt Kim
*Assistant Examiner* — Yongjia Pan
(74) *Attorney, Agent, or Firm* — Pablo Tapia; Jim Ross; Micky Minhas

(57) ABSTRACT

Messages to a focal user are organized by relevance of the message originators. A visual representation of the messages includes a focal user representation (textual or graphic) and multiple contact representations (textual or graphic). The contact representations are displayed at respective relevance distances from the focal user representation. Text regions present the contents of messages from the source contacts, e.g., using graphic novel-style word balloons. The contact representations can be positioned on screen in maps, radar format, or other configurations. Users can filter contacts according to relevance, and can filter messages by pertinence.

20 Claims, 3 Drawing Sheets

(56) References Cited

U.S. PATENT DOCUMENTS

| | | | |
|---|---|---|---|
| 2006/0253787 A1* | 11/2006 | Fogg | 715/752 |
| 2007/0143281 A1* | 6/2007 | Smirin et al. | 707/5 |
| 2007/0150444 A1* | 6/2007 | Chesnais et al. | 707/3 |
| 2007/0200713 A1* | 8/2007 | Weber et al. | 340/573.1 |
| 2007/0239741 A1 | 10/2007 | Jordahl et al. | |
| 2007/0282621 A1 | 12/2007 | Altman | |
| 2007/0282962 A1* | 12/2007 | Kim et al. | 709/207 |
| 2008/0119176 A1 | 5/2008 | Chen | |
| 2008/0133336 A1 | 6/2008 | Altman | |
| 2008/0207274 A1* | 8/2008 | Kim | 455/566 |
| 2008/0229213 A1 | 9/2008 | Hamilton et al. | |
| 2008/0307320 A1* | 12/2008 | Payne et al. | 715/751 |
| 2009/0006285 A1 | 1/2009 | Meek et al. | |
| 2009/0136909 A1* | 5/2009 | Asukai et al. | 434/236 |
| 2009/0254840 A1* | 10/2009 | Churchill et al. | 715/753 |
| 2009/0300549 A1* | 12/2009 | Wang et al. | 715/835 |
| 2010/0050123 A1* | 2/2010 | Sherrard et al. | 715/836 |
| 2010/0070593 A1* | 3/2010 | Sayers et al. | 709/206 |
| 2010/0205179 A1* | 8/2010 | Carson et al. | 707/740 |
| 2010/0223341 A1* | 9/2010 | Manolescu et al. | 709/206 |
| 2010/0248701 A1* | 9/2010 | Vance et al. | 455/414.2 |
| 2010/0262916 A1* | 10/2010 | Jones et al. | 715/733 |
| 2011/0161329 A1* | 6/2011 | Winkler | 707/748 |
| 2011/0197152 A1* | 8/2011 | Assadollahi | 715/764 |
| 2012/0284336 A1* | 11/2012 | Schmidt et al. | 709/204 |

OTHER PUBLICATIONS

Jeffrey Heer, Danah Boyd, Vizster: Visualizing Online Social Networks, Oct. 23-25, 2005, 8 pages.*

Thomas Erickson, David N, Smith, Wendy A. Kellogg, Mark Laff, John T. Richards, Erin Bradner, Socially Translucent Systems: Social Proxies, Persistent Conversation, and the Design of "Babble", May 15-20, 1999 8 pages.*

Rigas, et al., "Graphical Browsing of Email Data: A Usability Based Comparative Study", Retrieved at <<http://www.scipub.org/fulltext/jcs/jcs510690-703.pdf>>, Journal of Computer Science 5 (10), 2009, pp. 690-703.

Fitrianie, et al., "Computed Ontology-based Situation Awareness of Multi-User Observations", Retrieved at <<http://www.iscram.org/ISCRAM2009/papers/Contributions/173_Computed%20Ontology-based%20Situational%20Awareness_Fitrianie2009.pdf>>, Proceedings of the 6th International ISCRAM Conference, May 2009, pp. 13.

Mandic, "Visualizing Rhythms of Intimacy in Email Communication", Retrieved at <<http://http://etd.tamu.edu/bitstream/handle/1969.1/3108/MANDIC-THESIS.pdf?sequence=1>>, Office of Graduate Studies of Texas A&M University, Dec. 2004, pp. 85.

Cleland-Huang, et al., "Automated Support for Managing Feature Requests in Open Forums", Communications of the ACM, vol. 52 No. 10, Oct. 2009, pp. 7.

* cited by examiner

RELEVANCE ORIENTED GRAPHICAL REPRESENTATION OF DISCUSSION MESSAGES

BACKGROUND

Graphic design disciplines emphasize visual communication and presentation methods. A graphic designer may use typography, visual arts, data visualization, and page layout techniques to convey information. Symbols, images and/or words can be combined to create a visual presentation of ideas. Composition of different visual components is an important aspect of graphic design, not least because the number of components to choose from, and the ways in which they can be combined, are each extremely large. Composition and other design efforts can enhance readability, aid comprehension, characterize features persuasively, and facilitate recall, for example.

Magazines, web pages, advertisements in various media, and product packaging are common examples of graphic design efforts. For example, graphic design can be used to create a product package which includes a vendor logo, descriptive text, and design elements such as shapes and colors. Graphic design efforts may be seen in a wide variety of items, from road signs to technical drawings, from textbooks and reference manuals to film credits and theatrical sets, to name just a few examples. In scientific journals and news reports, textual content reciting facts and hypotheses may be accompanied by helpful graphics. Newspapers, magazines, blogs, and other media use graphic design results to inform and entertain, both in still images and in video or film clips. On the web, interactive tools are also used to convey information in words and images, by integrating visual communication skills with human-computer interaction techniques.

SUMMARY

Message board and other online forum postings, email messages, and other collections of messages can include a large number of postings and/or other messages. Such messages are sometimes organized in threads, that is, according to which previous message one is replying to, and sometimes messages are manually sorted into user-created folders for different topics or entities. Messages may be sorted by time of post, from latest to earliest or from earliest to latest. Keyword search tools and date range filters are sometimes also available to help organize messages. Nonetheless, additional aids to message organization could be very helpful.

Some embodiments discussed herein provide message organization and display aids which take into account the relevance of message originators to a message recipient, and visually indicate the relevance of respective message originators. For example, assume a set of messages to a focal user is obtained, with each message having a source contact (message originator) and some content. A visual representation of the messages and related information is generated, including a focal user representation (textual or graphic) which visually represents the focal user, and multiple contact representations (textual or graphic) visually representing respective contacts. The contact representations are displayed on a computer or other device screen at respective relevance distances from the focal user representation, with the distances corresponding to the relevance of respective contacts to the focal user. The visual representation also includes text regions presenting the contents of messages from the source contacts. The contact representations can be positioned on screen in various configurations, such as within concentric regions around the focal user, within a two-dimensional map view, or within a three-dimensional illustration/representation of message originator, message recipient, and other discussion participants, for example.

Other variations are also described. For example, messages may be positioned by default according to their respective timestamps, in addition to being positioned according to the contact-to-focal-user relevance. In some versions, graphic novel-style balloons contain selected text which is being visually "spoken" (as it were) by still or animated avatars or other graphic representations of contacts. Some embodiments filter contacts by contact-to-focal-user relevance and do not display contact representations for contacts below a specified relevance threshold. Some embodiments filter messages by pertinence so the visual representation omits message text for messages below a specified pertinence threshold. As used herein, "relevance" is a measure of a relationship between two people, the focal user and a contact, whereas "pertinence" is a measure of a relationship between a message and a person, namely, the focal user.

The examples given are merely illustrative. This Summary is not intended to identify key features or essential features of the claimed subject matter, nor is it intended to be used to limit the scope of the claimed subject matter. Rather, this Summary is provided to introduce—in a simplified form— some concepts that are further described below in the Detailed Description. The innovation is defined with claims, and to the extent this Summary conflicts with the claims, the claims should prevail.

DESCRIPTION OF THE DRAWINGS

A more particular description will be given with reference to the attached drawings. These drawings only illustrate selected aspects and thus do not fully determine coverage or scope.

DETAILED DESCRIPTION

Overview

Figure 1:
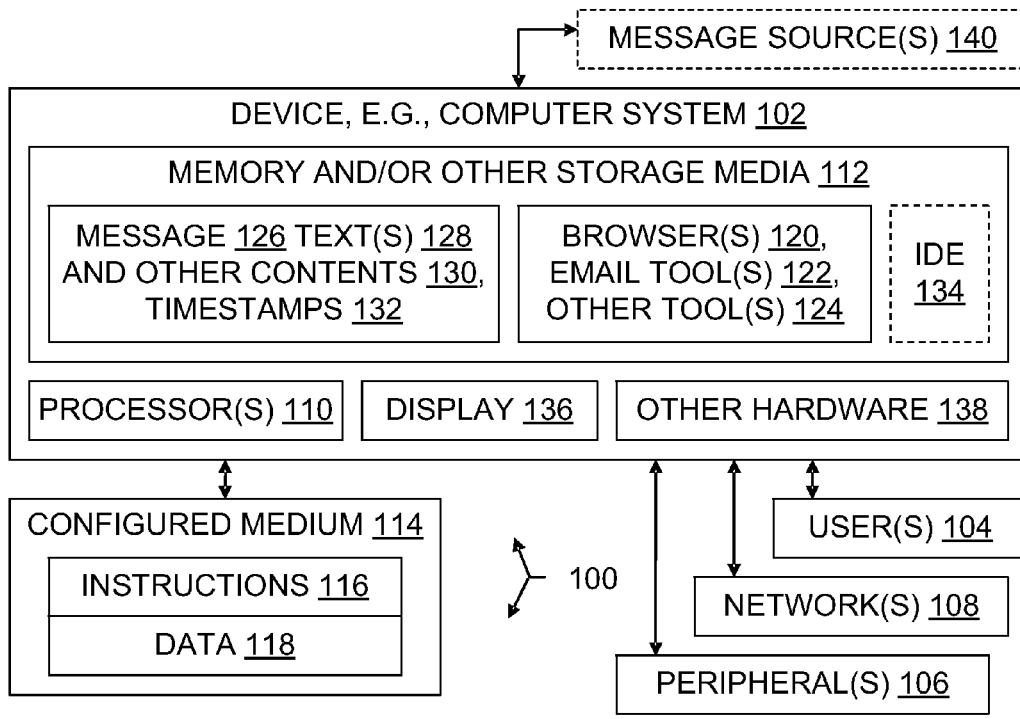
FIG. 1 is a block diagram illustrating a computer system having at least one processor, at least one memory, at least one browser or other tool for reading messages, and other items in an operating environment which may be present on multiple network nodes, and also illustrating configured storage medium embodiments.

A variety of available discussion-facilitating solutions display messages that are sent within a group of people. Some examples include browsers, email managers, forums, talkback systems, and other tools for organizing and presenting messages in online forums, in news groups, or in email threads. One common representation of messages is a chronological representation, in which the messages are ordered by date, generally with a subject line or other textual excerpt. Text or a small image identifies the poster or person who sent the message, sometimes with accompanying text in the form of an online name, email address, or other identifier. The messages are arranged in a linear list, sorted chronologically and/or by poster/sender.

Some tools provide ways to flag, tag, or infer how much a single message in a thread is relevant to the reader. Relevance may be calculated by evaluating the content or the sender of the message. However, message presentation advances beyond mere lists can be made, to effectively filter out messages that are less relevant and/or to provide an intuitive display of a message thread such that the relevance of every message is clear.

Some embodiments described herein provide a graphical representation of messages that uses graphical cues and visual hints to convey the relevance of messages in a context of a mail thread. For example, given a message thread and a relevance score indicating relevance of a message sender/poster to the current reader of the thread, some embodiments will display the messages in an intuitive way that conveys both the chronological aspect of the thread and the relevance of the messages/senders.

Some embodiments use a comics-like representation of group interaction. Some place contacts on a radar-like display to convey relevance to the viewing user. Some provide dynamic thresholding, filtering and pruning of messages according to their relevance, in a comics-like representation. As a particular example, some embodiments use a graphic-novel-like representation of a discussion, in which chronology is conveyed by a top-down ordering of balloons containing the messages and relevance is conveyed by placing an avatar of each message sender on a group of concentric circles expressing the sender's relevance distance from the user. The text balloons extend from the avatars. Other embodiments provide a different set of features.

Reference will now be made to exemplary embodiments such as those illustrated in the drawings, and specific language will be used herein to describe the same. But alterations and further modifications of the features illustrated herein, and additional applications of the principles illustrated herein, which would occur to one skilled in the relevant art(s) and having possession of this disclosure, should be considered within the scope of the claims.

The meaning of terms is clarified in this disclosure, so the claims should be read with careful attention to these clarifications. Specific examples are given, but those of skill in the relevant art(s) will understand that other examples may also fall within the meaning of the terms used, and within the scope of one or more claims. Terms do not necessarily have the same meaning here that they have in general usage, in the usage of a particular industry, or in a particular dictionary or set of dictionaries. Reference numerals may be used with various phrasings, to help show the breadth of a term. Omission of a reference numeral from a given piece of text does not necessarily mean that the content of a Figure is not being discussed by the text. The inventors assert and exercise their right to their own lexicography. Terms may be defined, either explicitly or implicitly, here in the Detailed Description and/or elsewhere in the application file.

As used herein, a "computer system" may include, for example, one or more servers, motherboards, processing nodes, personal computers (portable or not), personal digital assistants, cell or mobile phones, and/or device(s) providing one or more processors controlled at least in part by instructions. The instructions may be in the form of software in memory and/or specialized circuitry. In particular, although it may occur that many embodiments run on workstation or laptop computers, other embodiments may run on other computing devices, and any one or more such devices may be part of a given embodiment.

A "multithreaded" computer system is a computer system which supports multiple execution threads. The term "thread" should be understood to include any code capable of or subject to synchronization, and may also be known by another name, such as "task," "process," or "coroutine," for example. The threads may run in parallel, in sequence, or in a combination of parallel execution (e.g., multiprocessing) and sequential execution (e.g., time-sliced). Multithreaded environments have been designed in various configurations. Execution threads may run in parallel, or threads may be organized for parallel execution but actually take turns executing in sequence. Multithreading may be implemented, for example, by running different threads on different cores in a multiprocessing environment, by time-slicing different threads on a single processor core, or by some combination of time-sliced and multi-processor threading. Thread context switches may be initiated, for example, by a kernel's thread scheduler, by user-space signals, or by a combination of user-space and kernel operations. Threads may take turns operating on shared data, or each thread may operate on its own data, for example.

A "logical processor" or "processor" is a single independent hardware thread-processing unit. For example a hyperthreaded quad core chip running two threads per core has eight logical processors. Processors may be general purpose, or they may be tailored for specific uses such as graphics processing, signal processing, floating-point arithmetic processing, encryption, I/O processing, and so on.

A "multiprocessor" computer system is a computer system which has multiple logical processors. Multiprocessor environments occur in various configurations. In a given configuration, all of the processors may be functionally equal, whereas in another configuration some processors may differ from other processors by virtue of having different hardware capabilities, different software assignments, or both. Depending on the configuration, processors may be tightly coupled to each other on a single bus, or they may be loosely coupled. In some configurations the processors share a central memory, in some they each have their own local memory, and in some configurations both shared and local memories are present.

"Kernels" include operating systems, hypervisors, virtual machines, and similar hardware interface software.

"Code" means processor instructions, data (which includes constants, variables, and data structures), or both instructions and data.

"Automatically" means by use of automation (e.g., general purpose computing hardware configured by software for specific operations discussed herein), as opposed to without automation. In particular, steps performed "automatically" are not performed by hand on paper or in a person's mind; they are performed with a machine.

Throughout this document, use of the optional plural "(s)" means that one or more of the indicated feature is present. For example, "message(s)" means "one or more messages" or equivalently "at least one message".

Whenever reference is made to data or instructions, it is understood that these items configure a computer-readable memory thereby transforming it to a particular article, as opposed to simply existing on paper, in a person's mind, or as a transitory signal on a wire, for example.

Operating Environments

With reference to FIG. 1, an operating environment 100 for an embodiment may include a computer system 102. The computer system 102 may be a multiprocessor computer system, or not. An operating environment may include one or more machines in a given computer system, which may be clustered, client-server networked, and/or peer-to-peer networked. In some embodiments, the operating environment is a "cloud" of connected devices.

Human users 104 may interact with the computer system 102 by using displays, keyboards, and other peripherals 106.

System administrators, developers, engineers, and end-users are each a particular type of user 104. Automated agents acting on behalf of one or more people may also be users 104. Storage devices and/or networking devices may be considered peripheral equipment in some embodiments. Other computer systems not shown in FIG. 1 may interact with the computer system 102 or with another system embodiment using one or more connections to a network 108 via network interface equipment, for example.

The computer system 102 includes at least one logical processor 110. The computer system 102, like other suitable systems, also includes one or more computer-readable storage media 112. Storage media 112 may be of different physical types. The storage media 112 may be volatile memory, non-volatile memory, fixed in place media, removable media, magnetic media, and/or optical media (as opposed to merely a signal). In particular, a configured medium 114 such as a CD, DVD, memory stick, or other removable non-volatile memory medium may become functionally part of the computer system when inserted or otherwise installed, making its content accessible for use by processor 110. The removable configured medium 114 is an example of a computer-readable storage medium 112. Some other examples of computer-readable storage media 112 include built-in RAM, ROM, hard disks, and other storage devices which are not readily removable by users 104.

The medium 114 is configured with instructions 116 that are executable by a processor 110; "executable" is used in a broad sense herein to include machine code, interpretable code, and code that runs on a virtual machine, for example. The medium 114 is also configured with data 118 which is created, modified, referenced, and/or otherwise used by execution of the instructions 116. The instructions 116 and the data 118 configure the medium 114 in which they reside; when that memory is a functional part of a given computer system, the instructions 116 and data 118 also configure that computer system. In some embodiments, a portion of the data 118 is representative of real-world items such as product characteristics, inventories, physical measurements, settings, images, readings, targets, volumes, and so forth. Such data is also transformed by as discussed herein, e.g., by visualization, relevance-based placement, filtering, deployment, execution, modification, display, creation, loading, and/or other operations.

A web browser 120, email manager or other email tool 122, and other tools 124 for reading (and possibly also for posting/sending) messages 126, such as news aggregators, and other items shown in the Figures may reside partially or entirely within one or more media 112, thereby configuring those media. A message 126 includes text 128 and possibly other content 130 as well, such as digitally encoded sounds and images, executable code, database files, and so on, either embedded in or attached to the message at a message source 140. A message 126 also has at least one timestamp 132, representing the message's time of creation at a source 140, time of dispatch from the source 140, or time of receipt at the target system 102, for example.

A given operating environment 100 may include an Integrated Development Environment (IDE) 134 which provides a developer with a set of coordinated software development tools. In particular, some of the suitable operating environments for some embodiments include or help create a Microsoft® Visual Studio® development environment (marks of Microsoft Corporation) configured to support program development. Some suitable operating environments include Java® environments (mark of Sun Microsystems, Inc.), and some include environments which utilize languages such as C++ or C# ("C-Sharp"), but teachings herein are applicable with a wide variety of programming languages, programming models, and programs, as well as with endeavors outside the field of software development per se that use email, instant messages, web feeds, and/or other message technologies.

The illustrated operating environment 100 includes at least one display 136 such as a computer screen, smartphone screen, or other graphics display device. An operating environment may also include other hardware 138, such as buses, power supplies, and accelerators, for instance.

Some items are shown in outline form in FIG. 1 to emphasize that they are not necessarily part of the illustrated operating environment, but may interoperate with items in the operating environment as discussed herein. It does not follow that items not in outline form are necessarily required, in any Figure or any embodiment.

Systems

Figure 2:
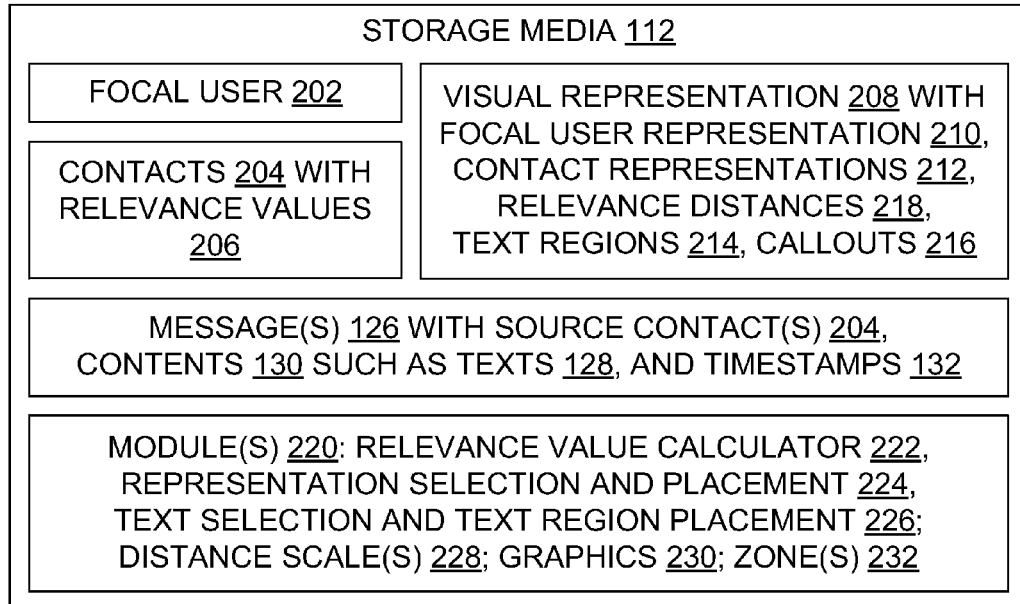
FIG. 2 is a block diagram illustrating message visualization components in an example architecture.

FIG. 2 illustrates an architecture which is suitable for use with some embodiments. A focal user 202 is a user with regard to whom relevance is calculated and visually indicated, such as a current user. The focal user 202 may be the sole person at whom messages 126 are targeted, e.g., the recipient of email messages, but some embodiments allow a given message to have more than one recipient. The messages 126 are created, or at least conveyed (e.g., forwarded), by contacts 204. For example, users who post forum messages 126 or create email messages 126 are among a focal user's contacts 204. Each contact 204 has a calculated relevance value with regard to the focal user 202. The relevance of a given contact C1 to a focal user F1 may well be different than the relevance of that same contact C1 to a different focal user F2.

Messages 126 from one or more contacts 204 to a given focal user 202 are presented on a display 136 in a visual representation 208 to facilitate organization and use of the messages by the focal user. The visual representation 208 includes a representation 210 of the focal user 202, and representation(s) 212 of respective contact(s) 204. Messages 126 are also represented, by text regions 214 which may include balloons or other callouts 216 extending graphically from the contact representation(s) 212. The relevance values 206 of displayed contacts are indicated by physical and/or numeric relevance distances 218 on the display 136, for example.

A given embodiment may include one or more modules 220 providing the following capabilities, which may be used to create and manage the visual representation 208 of messages 126.

A relevance value calculator 222 in module(s) 220 calculates (or retrieves previously calculated) relevance values 206. Relevance value for a given contact may be a value 206 provided by the focal user 202 or it may be based on various factors, such as how consistently or how quickly the focal user responds to the contact in question (absolute or relative measures may be used), where the contact and the focal user appear relative to each other in an organizational hierarchy, or whether the focal user has indicated a close relationship exists such as a family relationship with the contact.

A representation selection and placement 224 capability in module(s) 220 selects textual and/or graphics representations of users, e.g., a focal user representation 210 for the focal user 202 and contact representation(s) 212 for respective contact (s) 204. Representations may be selected by users, or selected automatically (assigned) by the embodiment. Placement of selected user representations 210, 212 in the visual representation 208 may be performed to reflect relevance value(s) 206, e.g., by placing contact representations closer to the focal representation when the contacts in question are more relevant.

A text selection and text region placement 226 capability in module(s) 220 selects message text 128 (including excerpts and/or full text) to be displayed in the visual representation 208 at a given point in time. A subject line may be selected, for example, as may the first N characters or M words of a message. Placement of selected message text 128 in the visual representation 208 may be performed by displaying the text in text region(s) 214 that include graphics-novel-style word balloons, annotations, starbursts, box callouts, centre text callouts, notes, comments, and/or other graphical callouts 216. Many callout examples which may be adapted for uses described herein are available, for instance, in the Microsoft Visio® tool collection of Shapes. Callouts are placed in the visual representation 208 in visual association with contact representations, e.g., by extending a word balloon from a contact's visual avatar.

Distance scales 228 may be supported in module(s) 220 for placement of avatars (graphic representations 210, 212) based on relevance values. Some embodiments place contact avatars at on-screen distances from the focal user avatar according to a generally logarithmic scale 228. For instance, in one embodiment avatars of contacts whose relevance to the focal user has a value of one-hundred-twenty-eight to two-hundred-fifty-five (a maximum) are placed within eight pixels of the focal user's avatar, contacts with relevance sixty-four to one-hundred-twenty-seven are placed within thirty-two to nine pixels of the focal user's avatar, contacts with relevance thirty-two to sixty-three are placed within one-hundred-twenty-eight to thirty-three pixels, and so on. Some embodiments place contact avatars at on-screen distances from the focal user avatar according to a generally linear scale 228. For instance, an avatar of a contact having relevance value R in a range from zero (least relevant) to one hundred (most relevant) is placed with its center at $(100-R)*8+20$ pixels from the center of the focal user's avatar. These are but a few of the many possible formulas in particular, and the many possible scales, in general, for visually linking avatar placement to relevance value 206.

Some embodiments include graphics 230 capabilities in module(s) 220, such as code for displaying avatars, callouts 216, other graphics 230, and text 128.

Figure 4:
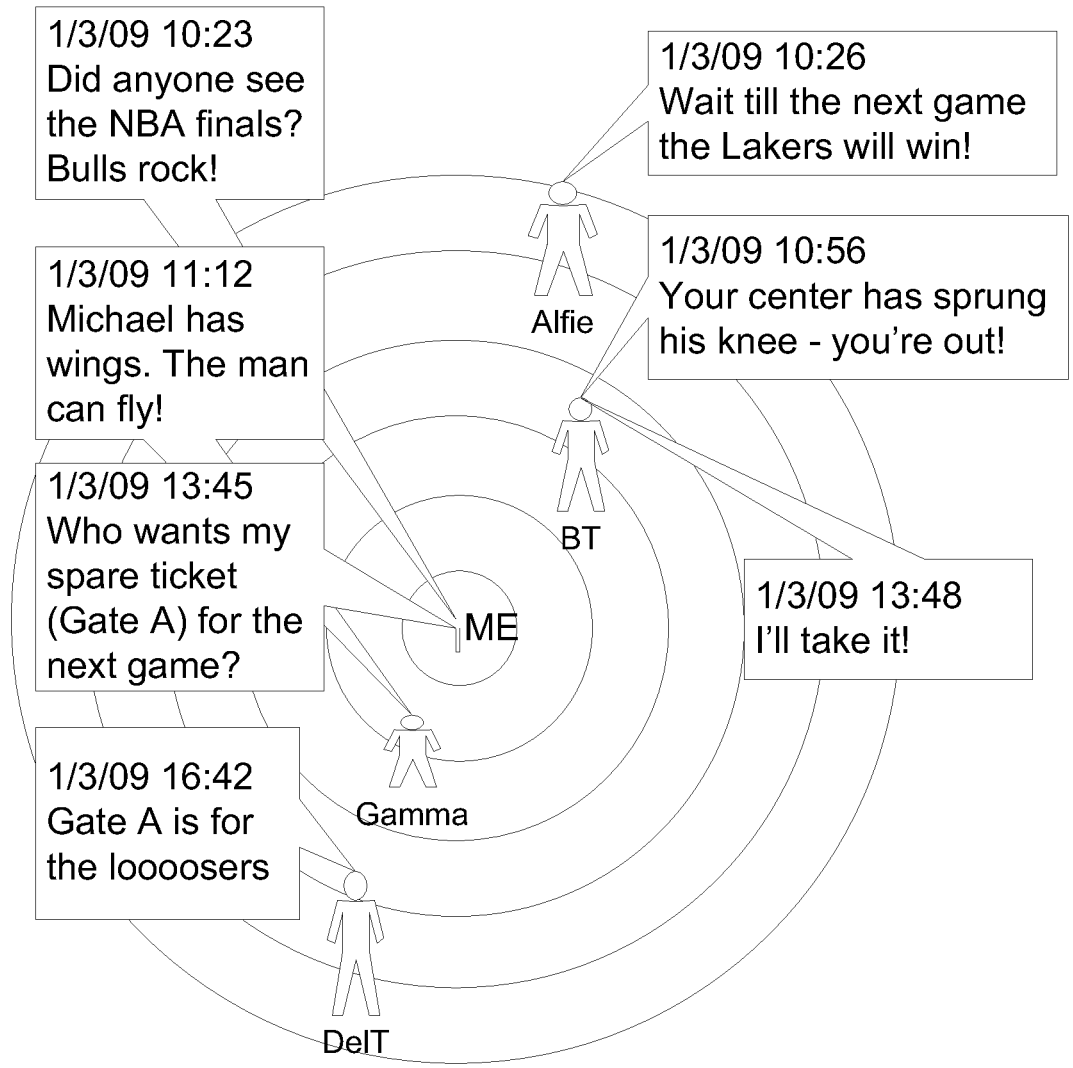
FIG. 4 is a simplified screen shot illustrating message visualization in some embodiments.

Some embodiments include module(s) 220 that define visually demarcated zone(s) 232 within which avatars are placed. For example, FIG. 4 shows avatars and their text balloons placed in zones 232 defined by concentric circles. Zones 232 may also be defined by other visual indicators, such as concentric semicircles, concentric quarter-circles, zones depicting geographic terrain, urban landscape maps, and so on.

Some embodiments provide a message display system having at least one logical processor 110, at least one display 136 (screen), and at least one memory (medium 112) in operable communication with the logical processor(s) and the display screen(s). A set of messages 126 resides in the memory(ies), with each message having a source contact 204 (e.g., poster, or sender) and a content (e.g., text 128). A visual representation structure (e.g., data and instructions) resides in the memory(ies) and configures the display with a visual representation 208 which includes a focal user representation 210 visually representing a focal user 202, and multiple contact representations 212 visually representing respective contacts 204. The contact representations 212 are displayed at respective relevance distances 218 from the focal user representation; the relevance distances 218 correspond to relevance values 206 indicating relevance of respective contacts to the focal user. The visual representation 208 also includes multiple text regions 214 representing contents 130 of respective messages 126, namely, messages whose source contacts are among the contacts visually represented by the contact representations.

In some embodiments, each message 126 has a timestamp 132, and the display 136 is configured with a visual representation 208 which includes multiple text regions 214 positioned in an order corresponding to their respective message's timestamps. For example, FIG. 4 illustrates a visual representation 208 in which messages are ordered from top to bottom according to increasing timestamp values.

In some embodiments, the display 136 is configured with a visual representation 208 which includes contact representations 212 positioned within concentric regions around the focal user representation 210, e.g., as shown in FIG. 4. In some other configurations, the contact representations 212 are positioned within a two-dimensional map view, or within a three-dimensional view.

In some embodiments, the text regions 214 include text callouts 216 having visual pointers to respective contact representations 212. For example, FIG. 4 shows text regions that include word balloons as text callouts 216.

In some embodiments, the display 136 is configured with a visual representation 208 in which contact representations 212 are positioned for display at respective relevance distances 218 from other contact representations such that whenever a contact X is more relevant to a contact Y than X is relevant to a contact Z, the contact X representation is closer to the contact Y representation than to the contact Z representation. That is, relevance between two contacts may be reflected in the display, in addition to relevance between a contact and the focal user.

Privacy concerns should be respected. Some users may consider or designate their relevance values as fully shareable (e.g., granting third person(s) access to the relevance between two users) whereas other users may consider or designate their relevance values as limited disclosure items. In configurations which allow a third user to make an assessment of the relevance value pertaining to two other users, respectful attention to privacy concerns is important. Users may thus be given clear written advance notice before a relevance value is disclosed outside the pair of users for which the relevance value is define, with an explanation and examples regarding how disclosure will occur, and how disclosure may be prevented or otherwise limited. Users may also be given an opportunity to waive the privacy of some or all of their relevance values.

In some embodiments peripherals 106 such as human user I/O devices (screen, keyboard, mouse, tablet, microphone, speaker, motion sensor, etc.) will be present in operable communication with one or more processors 110 and memory. However, an embodiment may also be deeply embedded in a system, such that no human user 104 interacts directly with the embodiment. Script interpreters, debuggers, simulators, record/playback controllers, and other software processes may be users 104.

In some embodiments, the system includes multiple computers connected by a network. Networking interface equipment can provide access to networks 108, using components such as a packet-switched network interface card, a wireless transceiver, or a telephone network interface, for example, will be present in a computer system. However, an embodiment may also communicate through direct memory access, removable nonvolatile media, or other information storageretrieval and/or transmission approaches, or an embodiment in a computer system may operate without communicating with other computer systems.

Some embodiments operate in a "cloud" computing environment and/or a "cloud" storage environment. For example, message sources 140 may be on multiple devices/systems 102 in a networked cloud, messages themselves may be stored on yet other devices within the cloud, and the visual representation may configure the display on yet other cloud device(s)/system(s) 102.

Methods

Figure 3:
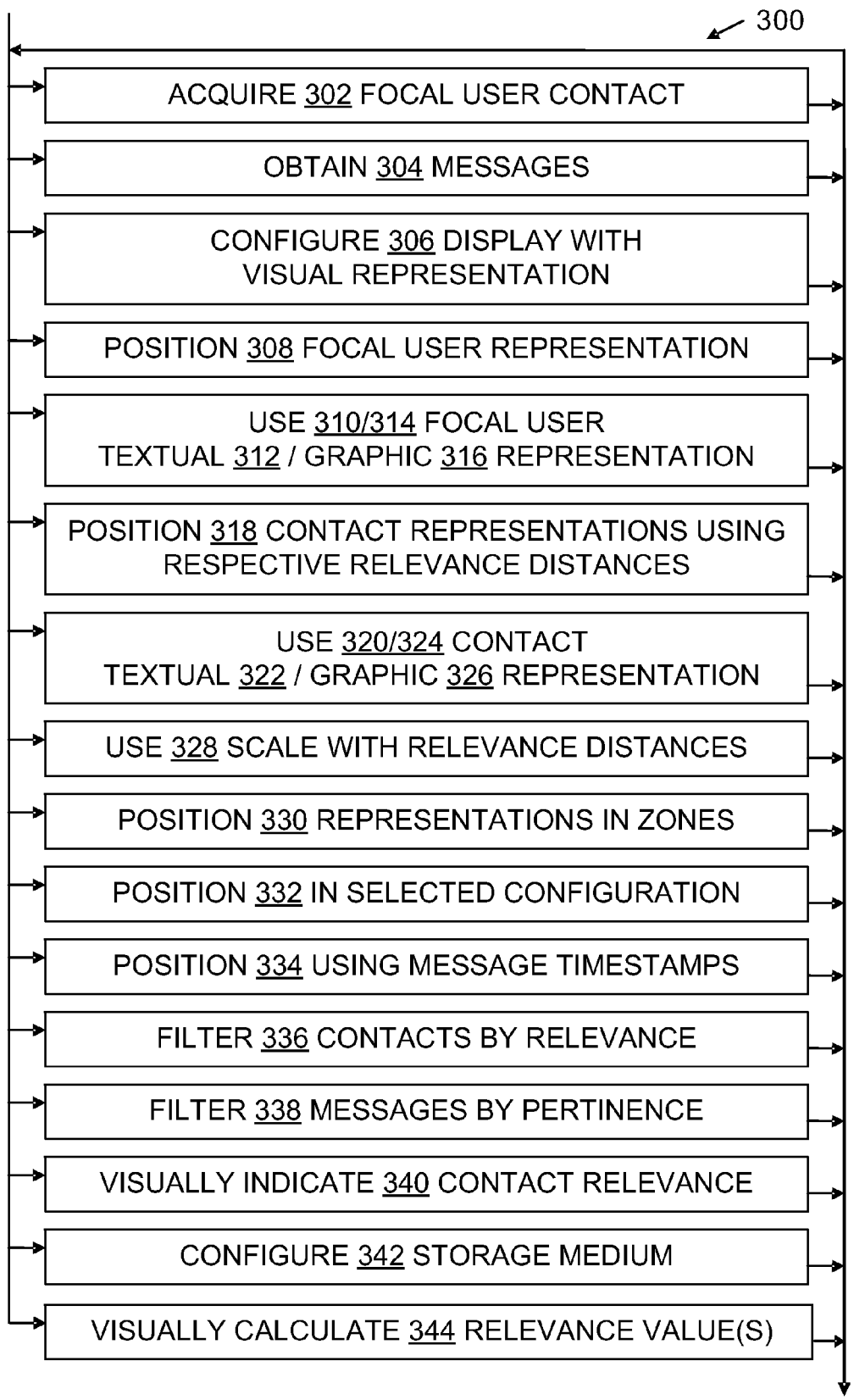
FIG. 3 is a flow chart illustrating steps of some method and configured storage medium embodiments.

FIG. 3 illustrates some method embodiments in a flowchart 300. Methods shown in the Figures may be performed in some embodiments automatically, e.g., by module(s) 220 which organize messages and generate visual representation(s) 208 under control of a script requiring little or no user input; generated visual representation(s) may then be stored in a medium 112 for possible later access by the focal user 202 or by administrative users. Methods may also be performed in part automatically and in part manually unless otherwise indicated. In a given embodiment zero or more illustrated steps of a method may be repeated, perhaps with different parameters or data to operate on. Steps in an embodiment may also be done in a different order than the top-to-bottom order that is laid out in FIG. 3. Steps may be performed serially, in a partially overlapping manner, or fully in parallel. The order in which flowchart 300 is traversed to indicate the steps performed during a method may vary from one performance of the method to another performance of the method. The flowchart traversal order may also vary from one method embodiment to another method embodiment. Steps may also be omitted, combined, renamed, regrouped, or otherwise depart from the illustrated flow, provided that the method performed is operable and conforms to at least one claim.

Examples are provided herein to help illustrate aspects of the technology, but the examples given within this document do not describe all possible embodiments. Embodiments are not limited to the specific implementations, arrangements, displays, features, approaches, or scenarios provided herein. A given embodiment may include additional or different features, mechanisms, and/or data structures, for instance, and may otherwise depart from the examples provided herein.

During a contacts acquiring step 302, an embodiment acquires in RAM or another medium 112 a set of contact(s) 204 of a specified focal user 202. Step 302 may be accomplished by using an email tool 122 address book, by scanning or otherwise obtaining a list of forum poster screen names, and/or by other mechanisms for identifying message sources 140, for example.

During a messages obtaining step 304, an embodiment obtains in RAM or another medium 112 a set of message(s) 126 to a specified focal user 202; messages may be directed solely at the focal user, or at a group that includes the focal user. Step 304 may be accomplished using an email tool 122, by scanning or otherwise obtaining a list of forum postings, and/or other mechanisms for identifying message contents 130, for example.

During a display configuring step 306, a display 136 is configured by an embodiment with a visual representation 208 containing at least one focal user representation 210 and at least one contact representation 212 with a corresponding relevance distance 218. Step 306 may be accomplished using graphics software and hardware in accordance with the teachings herein.

During a focal user representation positioning step 308, a focal user representation 210 is positioned by an embodiment in a display coordinate space (in RAM and/or on a display screen). The focal user representation 210 may be positioned 308 at or near the center of available space, for instance, or may be positioned 308 at or near a corner or an edge of available space. FIG. 4 illustrates placement of a focal user representation 210 at or near the center of available space. Step 308 may be accomplished using graphics software and hardware in accordance with the teachings herein, and may be considered a portion of display configuring step 306.

During a focal user textual representation using step 310, an embodiment uses a focal user textual representation 312, e.g., by positioning 308 the focal user textual representation 312 in a display space or by configuring 306 a display screen with the focal user textual representation 312. A focal user textual representation 312 contains text in a natural language, and may contain graphics, sound, and/or other constituents as well.

During a focal user graphic representation using step 314, an embodiment uses a focal user graphic representation 316, e.g., by positioning 308 the focal user graphic representation 316 in a display space or by configuring 306 a display screen with the focal user graphic representation 316. A focal user graphic representation 316 contains non-textual graphic content, and may contain text, sound, and/or other constituents as well. A particular focal user representation that includes both text and non-textual graphics qualifies as both a focal user textual representation 312 and a focal user graphic representation 316.

During a contact representation positioning step 318, a contact representation 212 is positioned by an embodiment in a display coordinate space (in RAM and/or on a display screen). The contact representation 212 may be positioned 318 in the available space not allocated to the focal user representation 210. FIG. 4 illustrates placement of four contact representations 212 in an available space. Step 318 may be accomplished using graphics software and hardware in accordance with the teachings herein, and may be considered a portion of display configuring step 306.

During a contact textual representation using step 320, an embodiment uses a contact textual representation 322, e.g., by positioning 318 the contact textual representation 322 in a display space or by configuring 306 a display screen with the contact textual representation 322. A contact textual representation 322 contains text in a natural language, and may contain graphics, sound, and/or other constituents as well.

During a contact graphic representation using step 324, an embodiment uses a contact graphic representation 326, e.g., by positioning 318 the contact graphic representation 326 in a display space or by configuring 306 a display screen with the contact graphic representation 326. A contact graphic representation 326 contains non-textual graphic content, and may contain text, sound, and/or other constituents as well. A particular contact representation that includes both text and non-textual graphics qualifies as both a contact textual representation 322 and a contact graphic representation 326.

During a scale using step 328, an embodiment uses a formula-based scale for mapping relevance values 206 to relevance distances 218 to be used in configuring 306 a display. The formula (s) may define a scale 228 in a linear mapping, a logarithmic mapping, or some other relationship.

During a zoned-positioning step 330, an embodiment positions representation(s) 210, 12 in zones while configuring 306 a display. Zones 232 may be defined using lines, textures, colors, and/or other visual mechanisms. FIG. 4 illustrates zones defined by concentric circles.

During a configuration-positioning step 332, an embodiment positions representation(s) 210, 12 in a selected view, map, or other configuration while configuring 306 a display.

Views may be top-down, perspective, moving camera, two-dimensional or higher, or a combination of the foregoing. Maps may simulate natural terrain, urban landscapes, or other settings, for example. Configurations may be still or animated.

During a chronological positioning step 334, an embodiment positions representation(s) 210, 12 and/or message text regions 214 in chronological order based on timestamps 132 while configuring 306 a display. FIG. 4 illustrates message text regions 214 positioned 334 in a chronological order with time increasing from the top of the visual representation 208 to the bottom.

During a contact relevance filtering step 336, an embodiment filters contacts 204 by their relevance value 206 with regard to a particular focal user 202, so that only contacts within a specified relevance range have representations 212 displayed in the visual representation 208. The range may be specified by a user or built-in, and may be an upper range (most relevant contacts), a lower range (least relevant contacts), or some other range. In some embodiments, contact representations are displayed only for contacts that have pending (e.g., unopened, undeleted) messages.

During a message pertinence filtering step 338, an embodiment filters messages 126 by their pertinence with regard to a particular focal user 202, so that only messages within a specified pertinence range have text regions 214 displayed in the visual representation 208. The range may be specified by a user or built-in, and may be an upper range (most pertinent messages), a lower range (least pertinent messages), or some other range. Pertinence may be calculated based on keywords in message text, on "urgent" or other priority flags placed on messages by senders/posters, and/or on other factors.

During a contact relevance visual indicating step 340 during a display configuring 306 step, an embodiment visually indicates contact relevance by a mechanism such as positioning more relevant contacts' representations 212 closer to the focal user representation 210 than less relevant contacts' representations, by coloring contact representations 212 differently according to their respective relevance values 206, and/or by making more relevant contacts' representations 212 larger than less relevant contacts' representations, for example.

During a memory or other medium configuring step 342, a medium 112 is configured by a visual representation 208, a representation selection and placement module 224, and/or otherwise in connection with relevance oriented graphical representation of discussion messages 126 as discussed herein.

During a relevance value calculating step 344, an embodiment calculates one or more relevance values 206. Relevance calculations may be based on factors such as the amount and frequency of tracked communication between two users, company organization charts, and/or the frequency of similar keywords in tracked communication between two users, for example.

The foregoing steps and their interrelationships are discussed in greater detail below, in connection with various embodiments.

Some embodiments provide a process for organizing message threads. The process utilizes a device which has at least one display 136, and at least one logical processor 110 in operable communication with at least one memory medium 112. The process includes acquiring 302 in the memory a set of contacts 204 of a focal user 202, each contact having a calculated relevance value 206 indicating relevance of the contact to the focal user; the relevance value can be calculated before, during, or after making a copy of other contact information in the memory and still satisfy this requirement. The process also obtains 304 in the memory a set of messages 126, each message having a source contact 204 and a content 130.

By operation of the processor, the process configures 306 the display with a visual representation 208 including a focal user representation 210 visually representing the focal user and multiple contact representations 212 visually representing respective contacts. The contact representations 212 display (e.g., by spatial position and/or numeric text) respective relevance distances 218 corresponding to relevance values 206 between the contacts and the focal user. The visual representation 208 also includes multiple text regions 214 representing contents of respective messages whose source contacts are among the contacts visually represented by the contact representations. Thus, the configured display 136 shows a focal user, contacts (in a list and/or with graphics), and messages (summarized and/or with excerpts or full content shown). A distance indication of the relevance of each contact to the focal user is also shown.

In some embodiments, the process configures 306 the display 136 with a visual representation 208 including a focal user textual representation 312 visually representing the focal user, multiple contact textual representations 322 visually representing respective contacts, and multiple text regions 214 representing contents of respective messages whose source contacts are among the contacts visually represented by the contact textual representations. In some embodiments, the contact representations are displayed with respective textual numeric relevance distances from the focal user graphic representation, the distances corresponding to relevance values between the contacts and the focal user. That is, a list format is used, with each relevance distance shown as a textual numeric value.

In some embodiments, the process configures 306 the display 136 with a visual representation 208 including a focal user graphic representation 316 visually representing the focal user, multiple contact graphic representations 326 visually representing respective contacts, and multiple text regions 214 representing contents of respective messages whose source contacts are among the contacts visually represented by the contact graphic representations. In some embodiments, the contact representations are displayed at respective relevance distances from the focal user graphic representation, the distances corresponding to relevance values between the contacts and the focal user. That is, a graphic format is used, by arranging avatars on screen at distances according to relevance with the current user (typically the focal user).

In some embodiments, the process configures 306 the display with a visual representation 208 in part by positioning 318 contact representations for display at respective relevance distances from the focal user graphic representation using 328 a linear distance scale 228 for displayed gaps between avatars. In some embodiments, the process configures 306 the display with a visual representation 208 in part by positioning 318 contact representations for display at respective relevance distances from the focal user graphic representation using 328 a logarithmic distance scale 228 for displayed gaps between avatars. Other monotonic functions can also be used 328 in formulas to define scales 228 for positioning or otherwise visually indicating relevance values 206 in a visual representation 208.

In some embodiments, the process configures 306 the display with a visual representation 208 in part by positioning 318 contact representations for display at respective relevance distances from the focal user graphic representation 316 such that whenever a contact X is more relevant to the focal user than a contact Y, the contact X graphic representation is closer to the focal user graphic representation than the contact Y graphic representation. Thus, if a contact is more relevant to the focal user then the contact's graphic is closer to the focal user's graphic. Closeness can be one mechanism indicating relevance; other mechanisms can be size, color, animation, or any other visual indication.

In some embodiments, each relevance value 206 lies within one of a set of relevance ranges that have corresponding display zones 232, with greater relevance ranges having respective display zones further from the focal user graphic representation 316. The process of configuring 306 the display with a visual representation includes positioning 318 contact graphic representations in the display zones 232 based on which relevance range each respective relevance distance lies within.

FIG. 4 illustrates one specific configuration with concentric annular zones 232. More generally, contacts are divided into groups according to relevance ranges. For example, if relevance goes from zero to 100 with 100 being most relevant, then one embodiment places all users with relevance 90-100 in a first circle nearest the focal user, places contacts with relevance 60-89 in the next (second) circle out, places users with relevance 10-59 in the next (third) circle out, and places all other users (relevance 0-9) outside that third circle.

In some embodiments, each message 126 has a timestamp 132, and the process configures 306 the display with a visual representation 208 which includes multiple text regions 214 positioned in the visual representation in an order corresponding to their respective message's timestamps. Messages may be arranged according to their timestamps in addition to the message source contact's relevance.

In some embodiments, the process organizes messages by acquiring 302 in a memory a set of contacts of a focal user; calculating 344 for each acquired contact a relevance value indicating relevance of the contact to the focal user; obtaining 304 in the memory a set of messages, each message having a source contact and a content; and configuring 306 a display with a visual representation. The visual representation includes a focal user representation visually representing the focal user, multiple contact representations visually representing respective contacts and visually indicating respective contact-to-focal-user relevance values, and multiple text regions representing contents of respective messages whose source contacts are among the contacts visually represented by the contact representations.

In some embodiments, the process filters 336 contacts by contact-to-focal-user relevance value such that the visual representation omits contact representations for contacts below a specified relevance threshold. In some, each message also has an indicated pertinence to the focal user, and the process filters 338 messages by pertinence such that the visual representation omits text regions for messages below a specified pertinence threshold.

In some embodiments, the contact representations visually indicate 340 respective contact-to-focal-user relevance values 206 with at least one of the following mechanisms: relative distance between contact representations and the focal user representation, relative size of contact representations, colors of contact representations.

In some embodiments, the process configures 306 the display with a visual representation 208 which includes multiple text regions 214 representing respective messages 126 in that each text region contains at least a portion of the message content 130. In some, each text region 214 has a visual pointer such as a callout 216 indicating the contact graphic representation 326 of the message's source contact. That is, the process displays message excerpts, and visually connects messages to contact graphics.

In some embodiments, the display is configured 306 with a visual representation 208 which includes contact graphic representations positioned 318 in at least one of the following configurations: within concentric circular regions around the focal user graphic representation, along a one-dimensional relevance axis, within a two-dimensional map view, in a multi-dimensional view.

In some embodiments, the process includes switching between views. That is, the process configures 306 the display with the visual representation indicating respective contact-to-focal-user relevance values and also configures 306 the display without using any of the following mechanisms to visually indicate contact-to-focal-user relevance values: relative distance between contact representations and the focal user representation, relative size of contact representations, colors of contact representations.

Configured Media

Some embodiments include a configured computer-readable storage medium 112. Medium 112 may include disks (magnetic disks, optical disks, or other disks), RAM, EEPROMS or other ROMs, and/or other configurable memory, including in particular computer-readable storage media (as opposed to propagated signal media). The storage medium which is configured may be in particular a removable storage medium 114 such as a CD, DVD, or flash memory. A general-purpose memory, which may be removable or not, and may be volatile or not, can be configured into an embodiment using items such as visual representations 208 and modules 220, in the form of data 118 and instructions 116, read from a removable medium 114 and/or another source such as a network connection, to form a configured storage medium. The configured storage medium 112 is capable of causing a computer system to perform method steps for transforming data through relevance oriented graphical representation of discussion messages 126 as disclosed herein. FIGS. 1 through 4 thus help illustrate configured storage media embodiments and method embodiments, as well as system and method embodiments. In particular, any of the method steps illustrated in FIG. 3, or otherwise taught herein, may be used to help configure a storage medium to form a configured storage medium embodiment.

Additional Examples

Additional details and design considerations are provided below. As with the other examples herein, the features described may be used individually and/or in combination, or not at all, in a given embodiment.

Let C be a list of contacts 204 in the system, e.g., a buddy list, with $C=\{c_1, c_2, c_3, \ldots, c_n\}$. Let similiarity(c) be a function from C to a similarity value (a.k.a. relevance value 206) expressing the similarity of contact $c_i$ to a current user who takes the role of focal user 202. Let T be a thread/discussion containing multiple messages $T=\{m_1, m_2, \ldots m_k\}$. Each message $m_i$ contains the following information {contact, timestamp, content} where content can be anything from a text message to binary data, such as an image, sound file, etc. Some embodiments also contain a function pertinence(m) mapping from a message to a pertinence value, expressing the pertinence of a message to the focal user as a reader. This function can use any part of the message to interpret the pertinence, e.g., by checking whether the message text contains words that interest the current user.

In this context, some embodiments use a visual representation 208 similar to a radar format like that shown in FIG. 4, with concentric circles depicting the distance from the center which represent the reader. Other visual representations can also be used to provide relevance and other information as discussed herein. In FIG. 4, the center graphic/position represents the current reader (focal user). The contacts that contributed messages to the displayed thread T are positioned around the user on the concentric circles. The radius to a contact is determined by a function that takes into account the similarity (relevance) of the contact, and available screen space. Thereafter, in a comics style, call-out balloons are extended from the different contacts. Each balloon represents a message in the thread, and is called-out from the avatar of the contact that sent the message. In this example, all messages are ordered from top to bottom according to their timestamp.

In some embodiments, a contact relevance threshold slider and/or a message pertinence threshold slider can be added to control which messages and which contacts appear on the radar. This can provide easy filtering 336, 338. For example, in the FIG. 4 example diagram, if the similarity function between the reader and the contacts is based on the team they are fans of, then one could filter out all the contacts that responded to the thread which are not similar to the reader. That is, one could hide all the contacts (and their messages) that are not fans of the same team as the focal user. Such filtering can allow faster and easier reading of the thread.

Conclusion

Although particular embodiments are expressly illustrated and described herein as methods, as configured media, or as systems, it will be appreciated that discussion of one type of embodiment also generally extends to other embodiment types. For instance, the descriptions of methods in connection with FIG. 3 also help describe configured media, and help describe the operation of systems and manufactures like those discussed in connection with other Figures. It does not follow that limitations from one embodiment are necessarily read into another. In particular, methods are not necessarily limited to the data structures and arrangements presented while discussing systems or manufactures such as configured memories.

Not every item shown in the Figures need be present in every embodiment. Conversely, an embodiment may contain item(s) not shown expressly in the Figures. Although some possibilities are illustrated here in text and drawings by specific examples, embodiments may depart from these examples. For instance, specific features of an example may be omitted, renamed, grouped differently, repeated, instantiated in hardware and/or software differently, or be a mix of features appearing in two or more of the examples. Functionality shown at one location may also be provided at a different location in some embodiments.

Reference has been made to the figures throughout by reference numerals. Any apparent inconsistencies in the phrasing associated with a given reference numeral, in the figures or in the text, should be understood as simply broadening the scope of what is referenced by that numeral.

As used herein, terms such as "a" and "the" are inclusive of one or more of the indicated item or step. In particular, in the claims a reference to an item generally means at least one such item is present and a reference to a step means at least one instance of the step is performed.

Headings are for convenience only; information on a given topic may be found outside the section whose heading indicates that topic.

All claims as filed are part of the specification.

While exemplary embodiments have been shown in the drawings and described above, it will be apparent to those of ordinary skill in the art that numerous modifications can be made without departing from the principles and concepts set forth in the claims. Although the subject matter is described in language specific to structural features and/or methodological acts, it is to be understood that the subject matter defined in the appended claims is not necessarily limited to the specific features or acts described above the claims. It is not necessary for every means or aspect identified in a given definition or example to be present or to be utilized in every embodiment. Rather, the specific features and acts described are disclosed as examples for consideration when implementing the claims.

All changes which come within the meaning and range of equivalency of the claims are to be embraced within their scope to the full extent permitted by law.

What is claimed is:

1. A process for organizing message threads, the process utilizing a device which has at least one display, and at least one logical processor in operable communication with at least one memory, the process comprising the steps of:

acquiring in the memory a set of contacts of a focal user, each contact having a calculated relevance value indicating relevance of the contact to the focal user;

obtaining in the memory a set of messages, each message having a source contact and a content;

by operation of the processor, configuring the display with a visual representation including:

a focal user representation visually representing the focal user;

multiple contact representations visually representing respective contacts, the contact representations displaying respective relevance distances corresponding to relevance values between the contacts and the focal user; and multiple text regions representing contents of respective messages whose source contacts are among the contacts visually represented by the contact representations;

the visual representation also characterized in at least five of the following ways:

(a) contact representations are positioned for display at respective relevance distances from the focal user graphic representation using a logarithmic distance scale;

(b) contact representations visually indicate respective contact-to-focal-user relevance values by the relative size of contact representations;

(c) a contact relevance threshold slider controls which contacts appear;

(d) a message pertinence threshold slider controls which messages appear;

(e) comics-style message call-out balloons extend from at least two of the contacts;

(f) contact representations are positioned for display at respective distances from the focal user graphic representation using a formula of the form (MaxRelevance−ContactRelevance)*ScaleFactor+Offset, where relevance values range between zero and MaxRelevance, ScaleFactor is a scalar, and Offset is measured in pixels;

(g) contact representations are positioned for display in zones depicting geographic terrain;

(h) contact representations are positioned for display in zones depicting an urban landscape; or (i) contact graphic representations are positioned for display at respective relevance distances from other contact graphic representations, including a contact X, a contact Y, and a contact Z, wherein contact X is more relevant to contact Y than X is relevant to contact Z, and wherein the contact X graphic representation is therefore displayed closer to the contact Y graphic representation than it is to the contact Z graphic representation.

2. The process of claim 1, comprising configuring the display with a visual representation including:
- a focal user textual representation visually representing the focal user;
- multiple contact textual representations visually representing respective contacts, the contact representations displayed with respective textual numeric relevance distances from the focal user graphic representation, the distances corresponding to relevance values between the contacts and the focal user; and
- multiple text regions representing contents of respective messages whose source contacts are among the contacts visually represented by the contact textual representations.

3. The process of claim 1, comprising configuring the display with a visual representation including:
- a focal user graphic representation visually representing the focal user;
- multiple contact graphic representations visually representing respective contacts, the contact representations displayed at respective relevance distances from the focal user graphic representation, the distances corresponding to relevance values between the contacts and the focal user; and
- multiple text regions representing contents of respective messages whose source contacts are among the contacts visually represented by the contact graphic representations.

4. The process of claim 3, wherein configuring the display with a visual representation comprises positioning contact representations for display at respective relevance distances from the focal user graphic representation such that whenever a contact X is more relevant to the focal user than a contact Y, the contact X graphic representation is closer to the focal user graphic representation than the contact Y graphic representation.

5. The process of claim 3, wherein each relevance value lies within one of a set of relevance ranges that have corresponding display zones, with greater relevance ranges having respective display zones further from the focal user graphic representation, and wherein configuring the display with a visual representation comprises positioning contact graphic representations in the display zones based on which relevance range each respective relevance distance lies within.

6. The process of claim 1, wherein each message has a timestamp, and the process comprises configuring the display with a visual representation which includes multiple text regions positioned in the visual representation in an order corresponding to their respective message's timestamps.

7. A message display system comprising:
- at least one logical processor;
- at least one display screen;
- at least one memory in operable communication with the logical processor(s) and the display screen(s);
- a set of messages residing in the memory(ies), each message having a source contact and a content; and
- a visual representation structure residing in the memory(ies) and configuring the display screen(s) with a visual representation including:
  - a focal user graphic representation visually representing a focal user;
  - multiple contact graphic representations visually representing respective contacts, the contact representations displayed at respective relevance distances from the focal user graphic representation, the distances corresponding to relevance values indicating relevance of respective contacts to the focal user;
  - multiple text regions representing contents of respective messages whose source contacts are among the contacts visually represented by the contact graphic representations; and
  - wherein the display is characterized in at least five of the following ways:
    - (a) contact representations are positioned for display at respective relevance distances from the focal user graphic representation using a logarithmic distance scale;
    - (b) contact representations visually indicate respective contact-to-focal-user relevance values by the relative size of contact representations;
    - (c) a contact relevance threshold slider controls which contacts appear;
    - (d) a message pertinence threshold slider controls which messages appear;
    - (e) comics-style message call-out balloons extend from at least two of the contacts;
    - (f) contact representations are positioned for display at respective distances from the focal user graphic representation using a formula of the form (MaxRelevance−ContactRelevance)*ScaleFactor+Offset, where relevance values range between zero and MaxRelevance, ScaleFactor is a scalar, and Offset is measured in pixels;
    - (g) contact representations are positioned for display in zones depicting geographic terrain;
    - (h) contact representations are positioned for display in zones depicting an urban landscape; or
    - (i) contact graphic representations are positioned for display at respective relevance distances from other contact graphic representations, including a contact X, a contact Y, and a contact Z, wherein contact X is more relevant to contact Y than X is relevant to contact Z, and wherein the contact X graphic representation is therefore displayed closer to the contact Y graphic representation than it is to the contact Z graphic representation.

8. The system of claim 7, wherein each message has a timestamp, and the display is configured with a visual representation which includes multiple text regions positioned in an order corresponding to their respective message's timestamps.

9. The system of claim 7, wherein the display is configured with a visual representation which includes contact graphic representations positioned in at least one of the following configurations:
- within concentric regions around the focal user graphic representation;
- within a two-dimensional map view;
- within a three-dimensional view.

10. The system of claim 7, wherein the text regions include text callouts having visual pointers to respective contact graphic representations.

11. A computer-readable storage medium configured with data and with instructions that when executed by at least one processor causes the processor(s) to perform a process for organizing messages, the process comprising the steps of:
- acquiring in a memory a set of contacts of a focal user;

calculating for each acquired contact a relevance value indicating relevance of the contact to the focal user;

obtaining in the memory a set of messages, each message having a source contact and a content;

by operation of the processor, configuring a display with a visual representation including:

a focal user representation visually representing the focal user;

multiple contact representations visually representing respective contacts, the contact representations visually indicating respective contact-to-focal-user relevance values; and multiple text regions representing contents of respective messages whose source contacts are the contacts visually represented by the contact representations;

the visual representation also characterized in at least five of the following ways:

(a) contact representations are positioned for display at respective relevance distances from the focal user graphic representation using a logarithmic distance scale;

(b) contact representations visually indicate respective contact-to-focal-user relevance values by the relative size of contact representations;

(c) a contact relevance threshold slider controls which contacts appear;

(d) a message pertinence threshold slider controls which messages appear;

(e) comics-style message call-out balloons extend from at least two of the contacts;

(f) contact representations are positioned for display at respective distances from the focal user graphic representation using a formula of the form (MaxRelevance−ContactRelevance)*ScaleFactor+Offset, where relevance values range between zero and MaxRelevance, ScaleFactor is a scalar, and Offset is measured in pixels;

(g) contact representations are positioned for display in zones depicting geographic terrain;

(h) contact representations are positioned for display in zones depicting an urban landscape; or (i) contact graphic representations are positioned for display at respective relevance distances from other contact graphic representations, including a contact X, a contact Y, and a contact Z, wherein contact X is more relevant to contact Y than X is relevant to contact Z, and wherein the contact X graphic representation is therefore displayed closer to the contact Y graphic representation than it is to the contact Z graphic representation.

12. The configured computer-readable storage medium of claim 11, wherein the process further comprises filtering contacts by contact-to-focal-user relevance value such that the visual representation omits contact representations for contacts below a specified relevance threshold.

13. The configured computer-readable storage medium of claim 11, wherein each message also has an indicated pertinence to the focal user, and the process further comprises filtering messages by pertinence such that the visual representation omits text regions for messages below a specified pertinence threshold.

14. The configured computer-readable storage medium of claim 11, wherein contact representations visually indicate respective contact-to-focal-user relevance values with at least one of the following mechanisms:

relative distance between contact representations and the focal user representation;

relative size of contact representations;

colors of contact representations.

15. The configured computer-readable storage medium of claim 11, wherein the process comprises configuring the display with a visual representation which includes multiple text regions representing respective messages, each text region containing at least a portion of the message content, each text region having a visual pointer indicating the contact graphic representation of the message's source contact.

16. The configured computer-readable storage medium of claim 11, wherein the process comprises configuring the display with a visual representation which includes contact graphic representations positioned in at least one of the following configurations:

within concentric circular regions around the focal user graphic representation;

along a one-dimensional relevance axis;

within a two-dimensional map view;

in a multi-dimensional view.

17. The configured computer-readable storage medium of claim 11, wherein each message has a timestamp, and the process comprises configuring the display with a visual representation which includes multiple text regions positioned in the visual representation in an order corresponding to their respective message's timestamps.

18. The configured computer-readable storage medium of claim 11, wherein the process comprises switching between views, namely, configuring the display with the visual representation indicating respective contact-to-focal-user relevance values and also configuring the display without using any of the following mechanisms to visually indicate contact-to-focal-user relevance values:

relative distance between contact representations and the focal user representation;

relative size of contact representations;

colors of contact representations.

19. The configured computer-readable storage medium of claim 11, wherein the visual representation is characterized in at least the following way: contact representations visually indicate respective contact-to-focal-user relevance values by the relative size of contact representations.

20. The configured computer-readable storage medium of claim 11, wherein the visual representation is characterized in at least the following way: a message pertinence threshold slider controls which messages appear.

* * * * *